(12) United States Patent
Jiang et al.

(10) Patent No.: US 8,502,786 B2
(45) Date of Patent: *Aug. 6, 2013

(54) TOUCH PANEL

(75) Inventors: Kai-Li Jiang, Beijing (CN); Shou-Shan Fan, Beijing (CN); Ga-Lane Chen, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 646 days.

This patent is subject to a terminal disclaimer.

(21) Appl. No.: 12/286,266

(22) Filed: Sep. 29, 2008

(65) Prior Publication Data

US 2009/0101488 A1    Apr. 23, 2009

(51) Int. Cl.
*G06F 3/044* (2006.01)

(52) U.S. Cl.
USPC .......................................... 345/173

(58) Field of Classification Search
USPC .............. 345/173, 174; 313/495; 438/800; 174/94 R; 428/1.3, 1.4, 408; 359/489.2; 349/123
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,071,927 B2 | 7/2006 | Blanchard | |
| 7,084,933 B2 | 8/2006 | Oh et al. | |
| 7,196,463 B2 * | 3/2007 | Okai et al. | 313/495 |
| 7,215,329 B2 | 5/2007 | Yoshikawa et al. | |

(Continued)

FOREIGN PATENT DOCUMENTS

| | | |
|---|---|---|
| CN | 2539375 | 3/2003 |
| CN | 1447279 | 10/2003 |

(Continued)

OTHER PUBLICATIONS

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).

(Continued)

*Primary Examiner* — Nabil Hindi
(74) *Attorney, Agent, or Firm* — Altis Law Group, Inc.

(57) ABSTRACT

A touch panel includes a substrate, a transparent conductive layer and at least two separate electrodes. The substrate has a first substrate surface and a second substrate surface opposite to the first substrate surface. The transparent conductive layer includes a carbon nanotube structure formed on the first substrate surface. The at least two separate electrodes are located on a surface of the transparent conductive layer and electrically connected thereto.

15 Claims, 7 Drawing Sheets

(56) References Cited

U.S. PATENT DOCUMENTS

| | | |
|---|---|---|
| 7,242,136 B2 | 7/2007 | Kim et al. |
| 7,336,261 B2 | 2/2008 | Yu |
| 7,348,966 B2 | 3/2008 | Hong et al. |
| 7,355,592 B2 | 4/2008 | Hong et al. |
| 7,532,182 B2 | 5/2009 | Tseng et al. |
| 7,593,004 B2 | 9/2009 | Spath et al. |
| 7,630,040 B2 * | 12/2009 | Liu et al. ............... 349/123 |
| 7,645,497 B2 * | 1/2010 | Spath et al. ............. 428/1.4 |
| 7,662,732 B2 * | 2/2010 | Choi et al. ............. 438/800 |
| 7,663,607 B2 | 2/2010 | Hotelling et al. |
| 7,704,480 B2 | 4/2010 | Jiang et al. |
| 7,710,649 B2 * | 5/2010 | Feng et al. ............. 359/489.2 |
| 7,796,123 B1 * | 9/2010 | Irvin et al. ............. 345/173 |
| 7,825,911 B2 | 11/2010 | Sano et al. |
| 7,854,992 B2 * | 12/2010 | Fu et al. ............... 428/408 |
| 7,947,977 B2 | 5/2011 | Jiang et al. |
| 7,956,287 B2 * | 6/2011 | Takayama et al. ........ 174/94 R |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kawase et al. |
| 2005/0209392 A1 | 9/2005 | Luo et al. |
| 2006/0010996 A1 | 1/2006 | Jordan et al. |
| 2006/0022221 A1 | 2/2006 | Furukawa et al. |
| 2006/0044284 A1 | 3/2006 | Tanabe |
| 2006/0061704 A1 | 3/2006 | Hayano et al. |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 | 12/2006 | Spath et al. |
| 2006/0274049 A1 | 12/2006 | Spath et al. |
| 2006/0275956 A1 | 12/2006 | Konesky |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0085838 A1 | 4/2007 | Ricks et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0007535 A1 | 1/2008 | Li |
| 2008/0029292 A1 | 2/2008 | Takayama et al. |
| 2008/0048996 A1 | 2/2008 | Hu et al. |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 * | 8/2008 | Kent et al. ............. 345/173 |
| 2008/0238882 A1 | 10/2008 | Sivarajan et al. |
| 2008/0248235 A1 | 10/2008 | Feng et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153514 A1 | 6/2009 | Jiang et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |
| 2012/0105371 A1 | 5/2012 | Hotelling et al. |

FOREIGN PATENT DOCUMENTS

| | | |
|---|---|---|
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | 61-283918 | 12/1986 |
| JP | S62-63332 | 3/1987 |
| JP | 62-139028 | 6/1987 |
| JP | S62-182916 | 8/1987 |
| JP | S62-190524 | 8/1987 |
| JP | 1-214919 | 8/1989 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 10-246605 | 9/1998 |

| | | |
|---|---|---|
| JP | 2001-34419 | 2/2001 |
| JP | 2001-267782 | 9/2001 |
| JP | 2002519754 | 7/2002 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | I287669 | 10/2007 |
| TW | 200926471 | 6/2009 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

George Gruner, "Carbon Nanonets Spark New Electronics", Scientific American, pp. 76-83, May 2007.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Mei Zhang etal., "Strong Transparent, Multifunctional, Carbon Nanotube Sheets", Science, America, AAAS, vol. 309, pp. 1215-1219, Aug. 19, 2005.

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Yu Xiang, Technique of Touch Panel & the Production of Resistance-type Touch Panel Insulation Dot, Journal of Longyan Teachers College, p. 25-26, vol. 22, No. 6, 2004.

ASM Handbook."Volume 2 Properties and Selection: Nonferrous Alloys and Special-Purpose Materials".Apr. 2007; pp. 840-853.

Wu et al."Transparent, Conductive Carbon Nanotube Films". Science,vol. 305,(2004);pp. 1273-1276.

Fan et al. "Self-Oriented Regular Arrays of Carbon Nanotubes and Their Field Emission Properties". Science, vol. 283, (1999); pp. 512-514.

Susuki et al."Investigation of physical and electric properties of silver pastes as binder for thermoelectric materials". Review of Scientific Instruments,76,(2005);pp. 023907-1 to 023907-5.

R Colin Johnson, "Carbon nanotubes aim for cheap, durable touch screens",Aug. 2007 http://psroc.phys.ntu.edu.tw/bimonth/v27/615.pdf.

Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f. HTM&catId=480502&newsType=NT&pageNo=null&encode=95e7014f.

Zhungchun Wu et al., "Transparent, Conductive Carbon Nanotube Films", Science, vol. 305, pp. 1273-1276, Aug. 27, 2004.

\* cited by examiner

TOUCH PANEL

RELATED APPLICATIONS

This application is related to commonly-assigned application Ser. No. 12/286,181, entitled, "TOUCH PANEL AND DISPLAY DEVICE USING THE SAME", filed on Sep. 29, 2008; Ser. No. 12/286,141, entitled, "TOUCH PANEL", filed on Sep. 29, 2008; Ser. No. 12/286,154, entitled, "TOUCH PANEL AND DISPLAY DEVICE USING THE SAME", filed on Sep. 29, 2008; Ser. No. 12/286,189, entitled, "TOUCH PANEL AND DISPLAY DEVICE USING THE SAME", filed on Sep. 29, 2008; Ser. No. 12/286,176, entitled, "TOUCH PANEL AND DISPLAY DEVICE USING THE SAME", filed on Sep. 29, 2008; Ser. No. 12/286,166, entitled, "TOUCH PANEL AND DISPLAY DEVICE USING THE SAME", filed on Sep. 29, 2008; Ser. No. 12/286,178, entitled, "TOUCH PANEL AND DISPLAY DEVICE USING THE SAME", filed on Sep. 29, 2008; Ser. No. 12/286,148, entitled, "TOUCH PANEL AND DISPLAY DEVICE USING THE SAME", filed on Sep. 29, 2008; Ser. No. 12/286,140, entitled, "TOUCHABLE CONTROL DEVICE", filed on Sep. 29, 2008; Ser. No. 12/286,146, entitled, "TOUCH PANEL AND DISPLAY DEVICE USING THE SAME", filed on Sep. 29, 2008; Ser. No. 12/286,216, entitled, "TOUCH PANEL AND DISPLAY DEVICE USING THE SAME", filed on Sep. 29, 2008; Ser. No. 12/286,152, entitled, "TOUCH PANEL AND DISPLAY DEVICE USING THE SAME", filed on Sep. 29, 2008; serial No. 12/286,145, entitled, "TOUCH PANEL AND DISPLAY DEVICE USING THE SAME", filed on Sep. 29, 2008; Ser. No. 12/286,155, entitled, "TOUCH PANEL, METHOD FOR MAKING THE SAME, AND DISPLAY DEVICE ADOPTING THE SAME", filed on Sep. 29, 2008; Ser. No. 12/286,179, entitled, "TOUCH PANEL AND DISPLAY DEVICE USING THE SAME", filed on Sep. 29, 2008; Ser. No. 12/286,228, entitled, "TOUCH PANEL, METHOD FOR MAKING THE SAME, AND DISPLAY DEVICE ADOPTING THE SAME", filed on Sep. 29, 2008; Ser. No. 12/286,153, entitled, "TOUCH PANEL AND DISPLAY DEVICE USING THE SAME", filed; Ser. No. 12/286,184, entitled, "TOUCH PANEL AND DISPLAY DEVICE USING THE SAME", filed on Sep. 29, 2008; Ser. No. 12/286,175, entitled, "METHOD FOR MAKING TOUCH PANEL", filed on Sep. 29, 2008; Ser. No. 12/286,195, entitled, "METHOD FOR MAKING TOUCH PANEL", filed on Sep. 29, 2008; Ser. No. 12/286,160, entitled, "TOUCH PANEL AND DISPLAY DEVICE USING THE SAME", filed on Sep. 29, 2008; Ser. No. 12/286,220, entitled, "TOUCH PANEL AND DISPLAY DEVICE USING THE SAME", filed on Sep. 29, 2008; Ser. No. 12/286,227, entitled, "TOUCH PANEL AND DISPLAY DEVICE USING THE SAME", filed on Sep. 29, 2008; Ser. No. 12/286,144, entitled, "TOUCH PANEL AND DISPLAY DEVICE USING THE SAME", filed on Sep. 29, 2008; Ser. No. 12/286,218, entitled, "TOUCH PANEL AND DISPLAY DEVICE USING THE SAME", filed on Sep. 29, 2008; Ser. No. 12/286,142, entitled, "TOUCH PANEL AND DISPLAY DEVICE USING THE SAME", filed on Sep. 29, 2008; Ser. No. 12/286,241, entitled, "TOUCH PANEL AND DISPLAY DEVICE USING THE SAME", filed on Sep. 29, 2008; Ser. No. 12/286,151, entitled, "TOUCH PANEL, METHOD FOR MAKING THE SAME, AND DISPLAY DEVICE ADOPTING THE SAME", filed on Sep. 29, 2008; Ser. No. 12/286,143, entitled, "ELECTRONIC ELEMENT HAVING CARBON NANOTUBES", filed on Sep. 29, 2008; and Ser. No. 12/286,219, entitled, "TOUCH PANEL, METHOD FOR MAKING THE SAME, AND DISPLAY DEVICE ADOPTING THE SAME", filed on Sep. 29, 2008. The disclosures of the above-identified applications are incorporated herein by reference.

BACKGROUND

1. Field of the Invention

The present invention relates to a carbon nanotube based touch panel.

2. Discussion of Related Art

Following the advancement in recent years of various electronic apparatuses, such as mobile phones, car navigation systems and the like toward high performance and diversification, there has been continuous growth in the number of electronic apparatuses equipped with optically transparent touch panels at the front of their respective display devices (e.g., a display such as a liquid crystal panel). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including a resistance-type, a capacitance-type, an infrared-type, and a surface sound wave-type, have been developed. Capacitance-type touch panels have several advantages, such as high accuracy and strong anti-jamming ability, and thus have been widely used.

Referring to FIGS. 5-7, a conventional capacitance-type touch panel, according to the prior art, includes a planar substrate 10, a transparent conductive layer 1 formed thereon, four metal electrodes 2a, 2b, 2c, 2d located on corners of the substrate 10 to form an equipotential surface. When a surface of the touch panel is touched by some object, such as a hand or touch pen, a coupling capacitance is formed between the object and the transparent conductive layer 1. The current then flows from the metal electrodes 2a, 2b, 2c, 2d to the touching point, to confirm the position of the touching point via calculating the ratio and the intensity of the current through the electrodes 2a, 2b, 2c, 2d.

Generally, the transparent conductive layer 1 is an indium tin oxide (ITO) layer. However, the optically transparent conductive layer (e.g., ITO layer) is generally formed by means of ion-beam sputtering, and this method is relatively complicated. Furthermore, the ITO layer has generally poor mechanical durability, low chemical endurance and uneven resistance over an entire area of the touch panel. Additionally, the ITO layer has relatively low transparency. All the above-mentioned problems of the ITO layer tend to yield a touch panel with low sensitivity, accuracy, and brightness.

What is needed, therefore, is to provide a durable touch panel with relatively high sensitivity and precision.

SUMMARY

In one embodiment, a touch panel includes a substrate, a transparent conductive layer and at least two separate electrodes. The substrate has a first substrate surface and a second substrate surface opposite to the first substrate surface. The transparent conductive layer includes a carbon nanotube structure formed on the first substrate surface. The at least two separate electrodes are located on a surface of the transparent conductive layer and electrically connected thereto.

Other advantages and novel features of the present touch panel will become more apparent from the following detailed description of exemplary embodiments, when taken in conjunction with the accompanying drawings.

BRIEF DESCRIPTION OF THE DRAWINGS

Many aspects of the present touch panel can be better understood with reference to the following drawings. The components in the drawings are not necessarily to scale, the emphasis instead being placed upon clearly illustrating the principles of the present touch panel.

Figure 1:
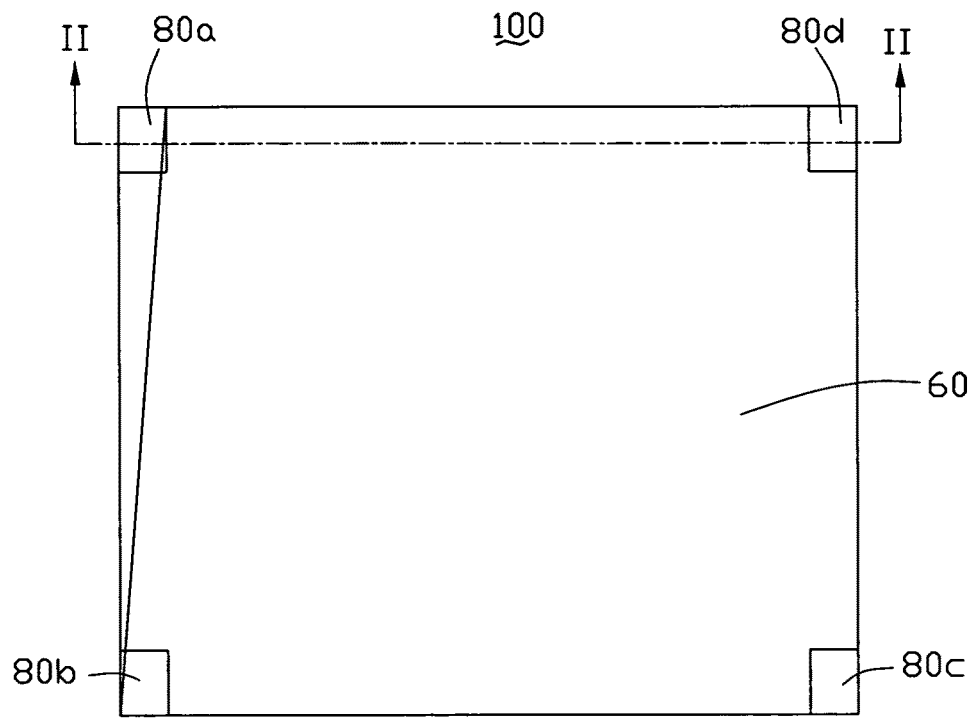
FIG. 1 is a top plan view of a touch panel in accordance with a present embodiment.

Corresponding reference characters indicate corresponding parts throughout the several views. The exemplifications set out herein illustrate at least one embodiment of the present touch panel, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel.

Figure 2:
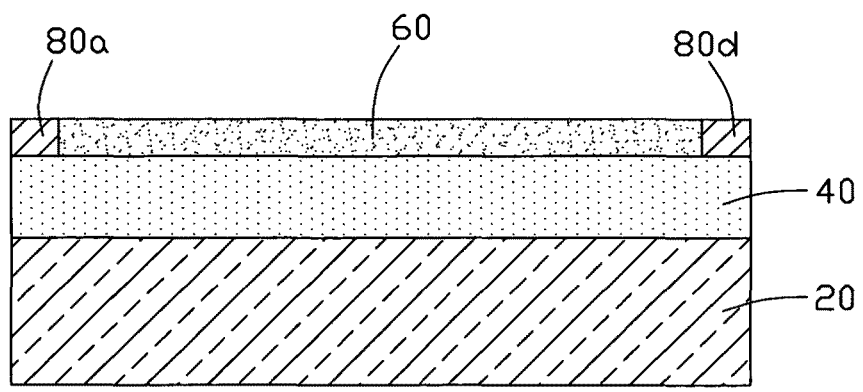
FIG. 2 is a cross-sectional schematic view of the touch panel of FIG. 4 along a line of V-V'.

Referring to FIG. 1 and FIG. 2, a touch panel 100 includes a substrate 20, a transparent conductive layer 40, a hardening layer 60, and at least two metal electrodes.

The substrate 20 has a first substrate surface and a second substrate surface opposite to the first substrate surface. The substrate 20 is transparent and the surfaces thereof are curved or planar. In the present embodiment, the material of the substrate 20 is glass. The transparent conductive layer is a carbon nanotube structure 40, and is formed on the first substrate surface. The at least two electrodes are formed of foil or conductive metal plating film with low-resistance, e.g., silver plating film or copper plating film. In the present embodiment, the touch panel 100 has four metal electrodes 80a, 80b, 80c, 80d. The metal electrodes 80a, 80b, 80c, 80d are located, separately, on the corners of a surface of the carbon nanotube structure 40. The metal electrodes 80a, 80b, 80c, 80d can be deposited on the corners of the carbon nanotube structure 40 by means of sputtering, electro-plating, or chemical plating. Alternatively, conductive adhesive, e.g., silver glue, can be used to adhere the metal electrodes 80a, 80b, 80c, 80d to the carbon nanotube structure 40. The metal electrodes 80a, 80b, 80c, 80d are electrically connected to the carbon nanotube structure 40.

It is noted that any other bonding ways can be adopted as long as the metal electrodes 80a, 80b, 80c, 80d can be electrically connected to the carbon nanotube structure 40. It can be understood that the metal electrodes 80a, 80b, 80c, 80d can be located on the first substrate surface, and being electrically connected to the carbon nanotube structure 40 via a circuit.

Figure 3:
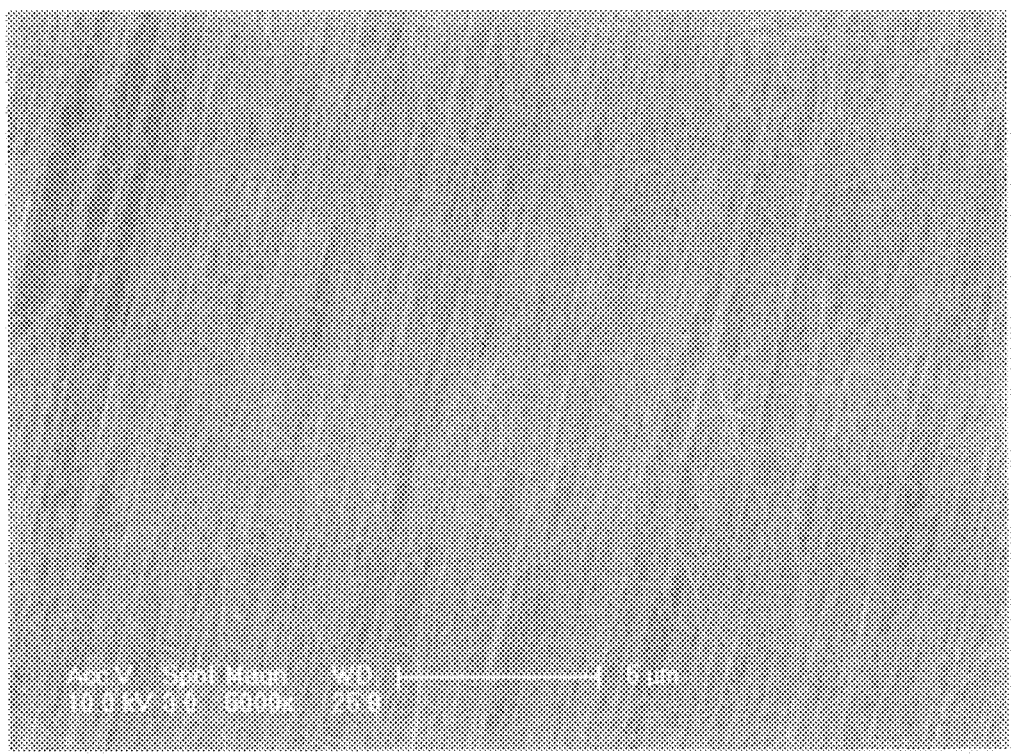
FIG. 3 shows a Scanning Electron Microscope (SEM) image of a carbon nanotube film used in the touch panel of FIG. 1.
Figure 4:
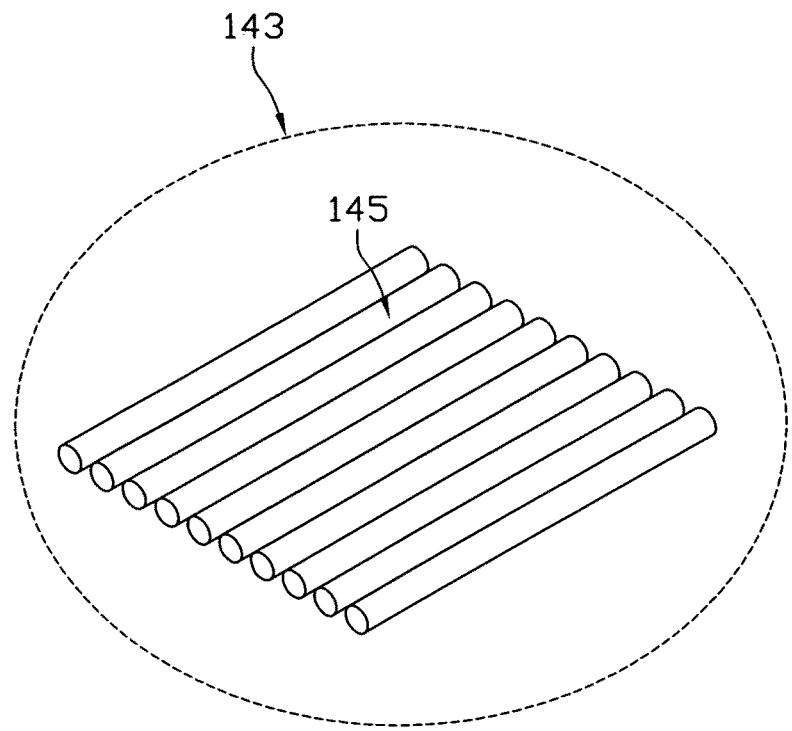
FIG. 4 is a structural schematic of a carbon nanotube segment.
Figure 5:
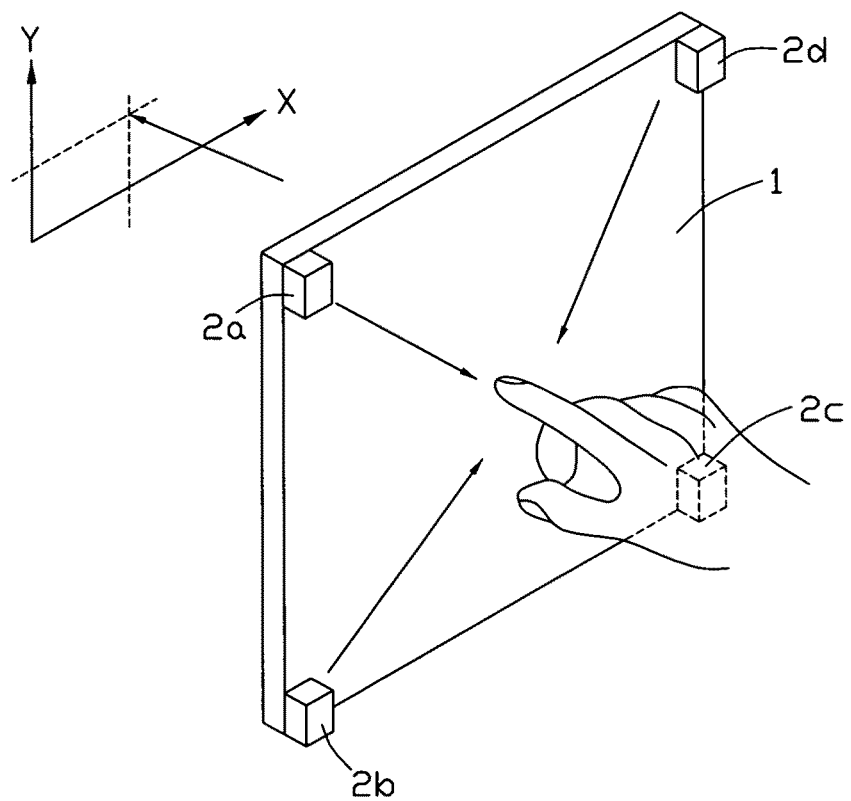
FIG. 5 is a schematic view of a conventional touch panel according to the prior art.
Figure 6:
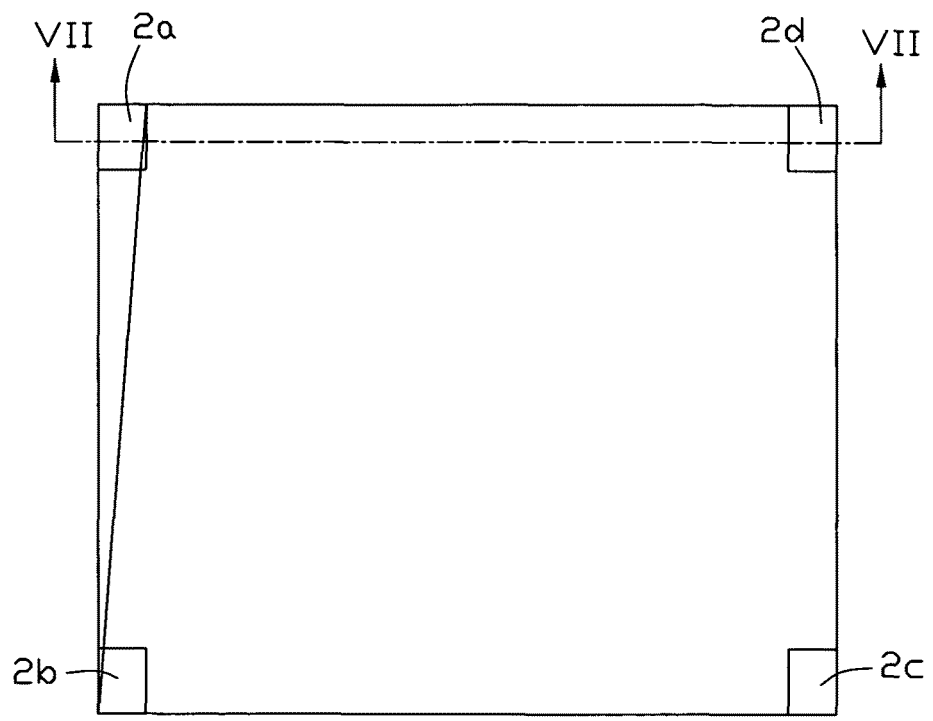
FIG. 6 is a top plan view of the touch panel of FIG. 5.
Figure 7:
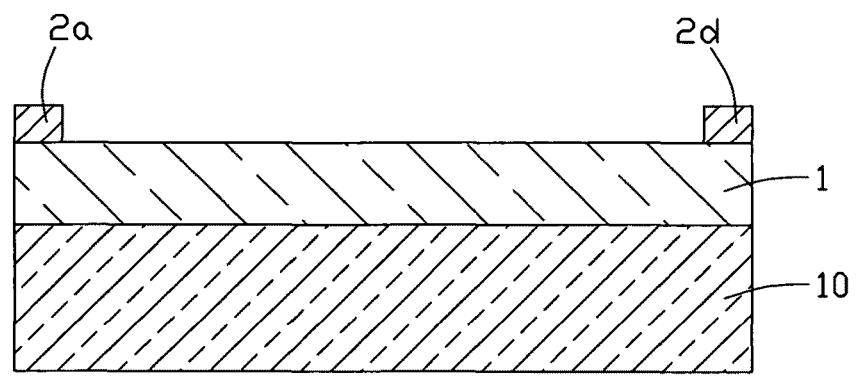
FIG. 7 is a cross-sectional schematic view of the touch panel of FIG. 6 along a line of VII-VII.

The carbon nanotube structure 40 includes at least one layer of carbon nanotube film, and can be a multi-layer carbon nanotube film formed by a plurality of coplanar or stacked carbon nanotube films. The number of the layers and the angle between the aligned directions of two adjacent layers may be set as desired. The adjacent layers of the carbon nanotube film are combined by van de Waals attractive force to form a stable multi-layer film. Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. Lengths of the carbon nanotube segments are generally equal. In the present embodiment, the carbon nanotube structure includes one carbon nanotube film.

A hardening layer 60 is located on the carbon nanotube structure 40 with metal electrodes thereon. The hardening layer 60 can be a polyester film or a silicon dioxide layer. The hardening layer 60 can enhance the durability and touching properties of the touch panel 100. In the present embodiment, the hardening layer 60 is a silicon dioxide layer and the hardness thereof is 7H (HRC). A thickness of the hardening layer 60 can be adjusted depending on actual applications. The hardening layer 60 is, directly, adhered to the carbon nanotube structure 40 via an adhesive. Alternatively, the hardening layer 60 can be directly adhered to the carbon nanotube structure 40 without the use of an adhesive.

The touch panel 100 can further include a shielding layer comprising of a second carbon nanotube film formed on the second substrate surface (i.e., the substrate 20 has two carbon nanotube films symmetrically arranged on the two opposite surfaces thereof). The two carbon nanotube films may have a same structure. The shielding layer is connected to the ground and plays a role of shielding, and thus enables the touch panel 100 to operate without interference, such as electromagnetic interference.

A method for making the carbon nanotube film includes the steps of: (a) providing an array of carbon nanotubes, or, providing a super-aligned array of carbon nanotubes; (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in an approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height of about 50 microns to 5 millimeters and include a plurality of carbon nanotubes 145 parallel to each other and approximately perpendicular to the substrate. The carbon nanotubes 145 in the array of carbon nanotubes can be multi-walled carbon nanotubes, double-walled carbon nanotubes or single-walled carbon nanotubes. Diameters of the single-walled carbon nanotubes approximately range from 0.5 to 50 nanometers. Diameters of the double-walled carbon nanotubes approximately range from 1 to 50 nanometers. Diameters of the multi-walled carbon nanotubes approximately range from 1.5 to 50 nanometers.

The super-aligned array of carbon nanotubes formed under the above conditions is essentially free of impurities such as carbonaceous or residual catalyst particles. The carbon nanotubes 145 in the super-aligned array are closely packed together by van der Waals attractive force therebetween.

In step (b), the carbon nanotube film can be formed by the substeps of: (b1) selecting one or more carbon nanotubes having a predetermined width from the array of carbon nanotubes; and (b2) pulling the carbon nanotubes to form nanotube segments 143 at an even/uniform speed to achieve a uniform carbon nanotube film.

In step (b1), quite usefully, the carbon nanotube segment 143 includes a plurality of carbon nanotubes 145 parallel to each other. The carbon nanotube segments 143 can be selected by using an adhesive tape as the tool to contact the super-aligned array of carbon nanotubes. In step (b2), the pulling direction is substantially perpendicular to the growing direction of the super-aligned array of carbon nanotubes.

More specifically, during the pulling process, as the initial carbon nanotube segments 143 are drawn out, other carbon nanotube segments 143 are also drawn out end to end due to van der Waals attractive force between ends of adjacent carbon nanotube segments 143. This process of drawing ensures a substantially continuous and uniform carbon nanotube film can be formed.

The carbon nanotube film includes a plurality of carbon nanotube segments 143. The carbon nanotubes 145 in the carbon nanotube film are all substantially parallel to the pulling/drawing direction of the carbon nanotube film, and the carbon nanotube film produced in such manner can be selectively formed having a predetermined width. The carbon nanotube film formed by the pulling/drawing method has superior uniformity of thickness and conductivity over a disordered carbon nanotube film. Further, the pulling/drawing method is simple, fast, and suitable for industrial applications.

The width of the carbon nanotube film depends on a size of the carbon nanotube array. The length of the carbon nanotube film can be arbitrarily set, as desired. In one useful embodiment, when the substrate is a 4 inch type wafer as in the present embodiment, the width of the carbon nanotube film is in an approximate range from 0.5 nanometers to 10 centimeters and the thickness of the carbon nanotube film is in the approximate range from 0.5 nanometers to 100 micrometers. The carbon nanotubes in the carbon nanotube film can be selected from a group consisting of single-walled carbon nanotubes, double-walled carbon nanotubes, and multi-layer carbon nanotubes. Diameters of the single-walled carbon nanotubes approximately range from 0.5 to 50 nanometers. Diameters of the double-walled carbon nanotubes approximately range from 1 to 50 nanometers. Diameters of the multi-walled carbon nanotubes approximately range from 1.5 to 50 nanometers.

It is noted that because the carbon nanotubes in the super-aligned carbon nanotube array have a high purity and a high specific surface area, the carbon nanotube film is adherent in nature. As such, the first carbon nanotube film can be adhered directly to a surface of the substrate 20. In the alternative, other bonding means can be applied.

The carbon nanotube film, once adhered to a surface of the substrate 20 can be treated with an organic solvent. The carbon nanotube film can be treated by using organic solvent to soak the entire surface of the carbon nanotube film. The organic solvent is volatilizable and can, suitably, be selected from the group consisting of ethanol, methanol, acetone, dichloroethane, chloroform, and combinations thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will adhere on the substrate 20 after the organic solvent treatment due to the surface tension of the organic solvent. Then the contacting area of the carbon nanotube film with the substrate will increase, and thus, the carbon nanotube film can more firmly adhere to the surface of the substrate 20. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film.

In operation, a voltage is applied to the carbon nanotube structure via metal electrodes 80a, 80b, 80c, 80d to form an equipotential surface. When the surface of the touch panel is contacted via hands or touch pens, a coupling capacitance is formed between the touching material and the transparent conductive layer 1. The current then flows from the metal electrodes 80a, 80b, 80c, 80d to the touching point. The position of the touching point is confirmed via calculating the ratio and the intensity of the current through the electrodes.

Compared to the conventional touch panel, the touch panel in the described embodiments comprises the following virtues. Firstly, since the carbon nanotube film has high mechanical strength and toughness, the transparent conductive layer adopting the carbon nanotube film acquires enhanced durability. Secondly, on account of the carbon nanotube film having a uniform structure, the transparent conductive layer adopting the carbon nanotube film has a uniform resistance distribution, and thus increases the sensitivity and precision of the touch panel.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A touch panel, comprising:
   one substrate having a first substrate surface and a second substrate surface opposite to the first substrate surface;
   a transparent conductive layer comprising a carbon nanotube layer located on the first substrate surface, the carbon nanotube layer comprising a plurality of carbon nanotubes, and a majority of carbon nanotubes in the carbon nanotube layer are aligned along a same direction;
   a second carbon nanotube film located on the second substrate surface; and
   at least two separate electrodes located on the surface of the transparent conductive layer and electrically connected to the transparent conductive layer.

2. The touch panel as claimed in claim 1, wherein the carbon nanotube layer comprises a first carbon nanotube film.

3. The touch panel as claimed in claim 2, wherein the first carbon nanotube film comprises a plurality of coplanar first carbon nanotube films.

4. The touch panel as claimed in claim 2, wherein the first carbon nanotube film comprises a plurality of carbon nanotube segments arranged in a preferred orientation, the plurality of carbon nanotube segments are joined end-to-end by van der Waals attractive force, each of the plurality of carbon nanotube segments comprises a plurality of carbon nanotubes parallel to each other and combined by van der Waals attractive force.

5. The touch panel as claimed in claim 1, wherein a thickness of the carbon nanotube layer approximately ranges from 0.01 microns to 100 microns.

6. The touch panel as claimed in claim 1, further comprising a hardening layer located on a surface of the carbon nanotube layer.

7. The touch panel as claimed in claim 6, wherein the hardening layer is a polyester film or a silicon dioxide layer.

8. The touch panel as claimed in claim 1, wherein the first substrate surface is curved.

9. The touch panel as claimed in claim 1, wherein the at least two electrodes are metal electrodes adhered to the carbon nanotube layer, and the at least two electrodes are electrically connected to the carbon nanotube layer.

10. The touch panel as claimed in claim 9, wherein the conductive adhesive is silver glue.

11. The touch panel as claimed in claim 1, wherein the material of the one substrate is glass.

12. The touch panel as claimed in claim 1, wherein the transparent conductive layer comprises at least two carbon nanotube layers, the at least two carbon nanotube layers are directly stacked with each other.

13. The touch panel as claimed in claim 12, wherein the majority of carbon nanotubes between adjacent carbon nanotube layers are perpendicular to each other.

14. The touch panel as claimed in claim 1, wherein the at least two electrodes are located at corners of the carbon nanotube layer.

15. The touch panel as claimed in claim 1, wherein carbon nanotube film located on the second substrate surface comprises a plurality of carbon nanotube segments arranged in a preferred orientation, the plurality of carbon nanotube segments are joined end-to-end by van der Waals attractive force, and each of the plurality of carbon nanotube segments comprises a plurality of carbon nanotubes parallel to each other and combined by van der Waals attractive force.

* * * * *